UNITED STATES PATENT OFFICE.

EDWARD A. JOHNSTON, OF CHICAGO, ILLINOIS, ASSIGNOR, BY MESNE ASSIGNMENTS, TO INTERNATIONAL HARVESTER COMPANY, A CORPORATION OF NEW JERSEY.

TRACTION-WHEEL.

1,395,422.  Specification of Letters Patent.  Patented Nov. 1, 1921.

Application filed May 21, 1917. Serial No. 170,049.

*To all whom it may concern:*

Be it known that I, EDWARD A. JOHNSTON, a citizen of the United States, residing at Chicago, in the county of Cook and State of Illinois, have invented certain new and useful Improvements in Traction-Wheels, of which the following is a full, clear, and exact specification.

This invention relates to traction wheels, and more particularly to wheels having detachable lugs therefor.

In many States and nations, the laws require that large lugs, which are so necessary in the transmission of tractive effort in relatively soft ground, shall not be drawn over or used on paved roads or streets. Such being the case, it is necessary that the large traction lugs be removed from the wheels of machines when such machines are drawn over pavements. Removable lugs heretofore have been used, but it has required considerable time to apply and remove the lugs from the wheels.

One object, therefore, of my invention is to facilitate and simplify the application and removal of traction lugs to and from wheels.

Another object is to apply removable lugs to wheels in an improved manner.

Another object of the invention is to provide a lug arrangement for wheels adapted to meet all of the requirements for successful commercial operation, both in soft ground and on paved roads and streets.

These objects are accomplished by providing, in combination, a wheel having a supporting portion, a shouldered member connected to said supporting portion, and a removable lug supported on said wheel by the shouldered member.

The invention is illustrated on the accompanying sheet of drawings, in which—

Figure 1 is a fragmentary plan view of a wheel equipped with removable lugs embodying my invention;

Fig. 2 is a fragmentary side elevation of the same;

Fig. 3 is a sectional view of the same taken in the plane of line 3—3 of Fig. 1; and, Fig. 4 is a fragmentary plan view of a traction wheel showing a modified form of lug applied thereto.

The various novel features of the invention will be apparent from the following description and drawings and will be particularly set forth in the appended claims.

The invention is shown in connection with a traction wheel 10 having spokes 11, to the outer ends of which is secured an annular rim or supporting member 12. Preferably permanently secured to the rim are lugs 13, each of which is shown as connected to the rim by a plurality of rivets 14. These lugs 13 extend transversely and obliquely with respect to the rim 12 of the wheel and are spaced circumferentially thereon. Each of the lugs has a central transversely extending body portion 16 and oppositely extending shoulder portions 17 and 18 which are spaced from the rim 12 of the wheel to form undercut portions or grooves 19, adjacent grooves of adjacent lugs 13 coöperating to form a receptive passageway for the oppositely extending flanges 20 of removable T-shaped lugs 21.

The rim 12 of the wheel is provided with a series of centrally arranged circular holes 22 which register with openings 23 cut or formed in the laterally extending projections 18 of the lug 13 and also registers with openings 24 cut or formed in one of the laterally extending flanges 20 of each of the removable lugs 21. When the removable lug 21 is placed into position, as shown in Fig. 1, so that its opening 24 registers with the other openings 22 and 23, cotter pins or other suitable keys 25 may be driven home or through the openings and spread, thereby locking the removable lugs 21 to the rim 12 of the wheel and also to the permanently secured lugs 13, the laterally extending flanges 20 of the removable lugs being retained under the shouldered portions 17 and 18 of the permanently secured lugs 13. In order to remove the lugs 21, it is merely necessary to withdraw the cotter pins or keys 25 and slide the removable lugs 21 laterally with respect to the permanently secured lugs 13 and rim 12 until the flanges 20 of the removable lugs have passed from under the laterally extending shoulders of the lugs 13. When the large traction lugs 21 are removed, it is seen that the relatively broad faces of the lugs 13, which are closely arranged on the rim of the wheel, present a relatively large and smooth surface which will not injure a paved road or street in any manner whatsoever.

It is apparent, therefore, that the relatively large removable traction lugs may be quickly applied and locked to the rim of the wheel for use in relatively soft ground and readily unlocked and removed from the rim of the wheel when the machine is to be used on paved roads.

In Fig. 1, it will be observed that the lugs 21, which are arranged transversely and obliquely on the rim of the wheel, extend beyond the rim of the wheel to provide for an increased tractive effort, while in Fig. 4, a shorter T-shaped lug 26 is provided which does not extend beyond, or even to the sides of, the rim. Where the ground is not extremely soft, lugs of the length shown in Fig. 4 will be sufficient. These lugs 26 are secured to the rim of the wheel in the same manner as considered in detail in connection with the other figures of the drawing.

By means of the lug arrangement herein shown and described, the applying and removal of lugs to wheels is greatly facilitated and simplified and the arrangement may be used in States and countries having stringent laws in connection with the use of lugs on paved roads.

It is apparent that there may be various modifications of the invention herein shown and described, and it is my intention to cover all such modifications which do not involve a departure from the scope of the invention as set forth in the following claims.

What I claim as new is:

1. In combination, a wheel having a supporting portion, shouldered members permanently connected to said supporting portion, a removable lug supported on said wheel by the shouldered members, said supporting portion, shouldered members and removable lug having registering openings, and means received by said registering openings to lock the removable lug on said wheel.

2. In combination, a wheel having a supporting portion, lugs permanently secured to the supporting portion and having adjacently arranged undercut portions, readily removable lugs having flanged portions received by said undercut portions, and means for locking said removable lugs to said other lugs.

3. In combination, a wheel having a supporting portion, lugs permanently secured to the supporting portion and having adjacently arranged undercut portions, a removable lug having flanged portions received by said undercut portions, said supporting portions and said removable lugs having registering openings, and means passing through said openings to lock the removable lugs in place.

4. In combination, a wheel having a supporting portion, lugs permanently secured thereto and circumferentially spaced thereon, said lugs having relatively large faces and undercut portions, removable lugs having laterally extending flanges received by said undercut portions, said supporting portion, removable lugs and permanently secured lugs having registering openings, and means passing through said openings to secure the removable lugs in place.

5. In combination, a wheel having a supporting portion, traction lugs secured to said supporting portion, the outer portions of the lugs lying in the same curved surface, the edges of the lugs being undercut to form relatively narrow transverse T-slots, and removable lugs secured in the T-slots, whereby the removable lugs may be removed to run on a paved street without injury thereto, or inserted for running on soft ground.

6. In combination, a wheel having a supporting portion, relatively wide spirally arranged lugs whose outer faces fall in substantially the same cylindrical surface secured to said supporting portions, relatively narrow T-shaped spaces between said lugs so that an element of said cylindrical surface will always fall on one or more lugs, and removable lugs secured in said T-shaped spaces.

In testimony whereof I affix my signature.

EDWARD A. JOHNSTON.